(12) United States Patent
Johansen et al.

(10) Patent No.: US 11,017,336 B2
(45) Date of Patent: *May 25, 2021

(54) RECOMMENDATION OF SHARED CONNECTIONS FOR DISPLAY

(71) Applicant: Microsoft Technology Licensing, LLC, Redmond, WA (US)

(72) Inventors: Amund Kronen Johansen, Tromsø (NO); Åge Kvalnes, Tromsø (NO); Dag Eidesen, Tromsø (NO); Tor Kreutzer, Tromsø (NO); Steffen Viken Valvåg, Tromsø (NO); Jan-Ove Karlberg, Tromsø (NO)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/799,580

(22) Filed: Feb. 24, 2020

(65) Prior Publication Data

US 2020/0193361 A1 Jun. 18, 2020

Related U.S. Application Data

(63) Continuation of application No. 15/631,745, filed on Jun. 23, 2017, now Pat. No. 10,572,845.

(51) Int. Cl.
*H04L 29/02* (2006.01)
*G06Q 10/06* (2012.01)
*H04L 12/58* (2006.01)
*G06Q 50/10* (2012.01)
*G06Q 30/02* (2012.01)
(Continued)

(52) U.S. Cl.
CPC ..... *G06Q 10/063118* (2013.01); *G06F 15/16* (2013.01); *G06F 16/9537* (2019.01); *G06Q 10/063* (2013.01); *G06Q 10/0639* (2013.01); *G06Q 30/0241* (2013.01); *G06Q 50/01* (2013.01); *G06Q 50/10* (2013.01); *H04L 51/12* (2013.01)

(58) Field of Classification Search
CPC ..................................................... H04L 51/12
See application file for complete search history.

(56) References Cited

U.S. PATENT DOCUMENTS

2005/0171799 A1* 8/2005 Hull .................... G06Q 30/0601
705/319
2016/0337399 A1* 11/2016 Kamath .................. H04L 43/14

* cited by examiner

*Primary Examiner* — Adnan M Mirza
(74) *Attorney, Agent, or Firm* — Shook, Hardy & Bacon L.L.P.

(57) ABSTRACT

In non-limiting examples of the present disclosure, systems, methods and devices for recommending a shared connection are presented. A set of shared connections between a first application user and a second application user may be identified. A determination may be made that a communication value between the first and second application users is below a recommendation surfacing threshold. A communication value between each application user of the set of shared connections and the first user may be calculated. A communication value between each application user of the set of shared connections and the second user may be calculated. One or both of the calculated communication values may be utilized to rank the shared connections based on importance to the first user, importance to the second user, and/or importance to the first user and the second user. One or more top ranked candidate user profiles may be promoted on a graphical user interface.

20 Claims, 9 Drawing Sheets

(51) Int. Cl.
*G06F 15/16* (2006.01)
*G06F 16/9537* (2019.01)
*G06Q 50/00* (2012.01)

RECOMMENDATION OF SHARED CONNECTIONS FOR DISPLAY

CROSS-REFERENCE TO RELATED APPLICATIONS

This application is a continuation of U.S. patent application Ser. No. 15/631,745, filed Jun. 23, 2017, and titled "RECOMMENDATION OF SHARED CONNECTIONS FOR DISPLAY", the entirety of which is incorporated herein by reference. The present application claims priority to the above-referenced application.

BACKGROUND

Social networking applications provide mechanisms for connecting and communicating with acquaintances, friends, colleagues, and businesses. Some application suites may provide similar functionality across a variety of applications. For example, one or more work-based applications (e.g., email applications, word processing applications, inter-office communication applications, etc.) may allow application users to view contact information, availability information, and connections of other application users that they interact with, or are otherwise connected to, on such applications.

It is with respect to this general technical environment that aspects of the present technology disclosed herein have been contemplated. Furthermore, although a general environment has been discussed, it should be understood that the examples described herein should not be limited to the general environment identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter. Additional aspects, features, and/or advantages of examples will be set forth in part in the description which follows and, in part, will be apparent from the description or may be learned by practice of the disclosure.

Non-limiting examples of the present disclosure describe systems, methods, and devices for recommending one or more shared connections between an application user that accesses another application user's profile and the application user associated with the profile. A determination may be made as to whether it may be useful to promote one or more shared connections to a viewer of another application user's profile. A set of shared connections may be identified between the viewer of the other application user's profile and the user associated with the profile. One or more communication signals associated with communications between each of the shared connections and the viewer of the other application user's profile may be received and analyzed. One or more communication signals associated with communications between each of the shared connections and the user associated with the profile may be received and analyzed. A communication value associated with communications between each of the shared connections and the viewer of the other application user's profile may be calculated. A communication value associated with communications between each of the shared connections and the other application user's profile may be calculated. In some examples, the shared connections may be ranked according to their importance, based on a corresponding communication value, to the user associated with the profile. In other examples, the shared connections may be ranked according to their importance, based on a corresponding communication value, to the viewer of the other application user's profile. In additional examples, the shared connections may be ranked according to their importance, based on a corresponding communication values and/or an importance value, to the viewer of the other application user's profile and the user associated with the profile. One or more top ranked profiles may be promoted on a graphical user interface.

BRIEF DESCRIPTION OF THE DRAWINGS

Non-limiting and non-exhaustive examples are described with reference to the following figures.

DETAILED DESCRIPTION

Figure 1:
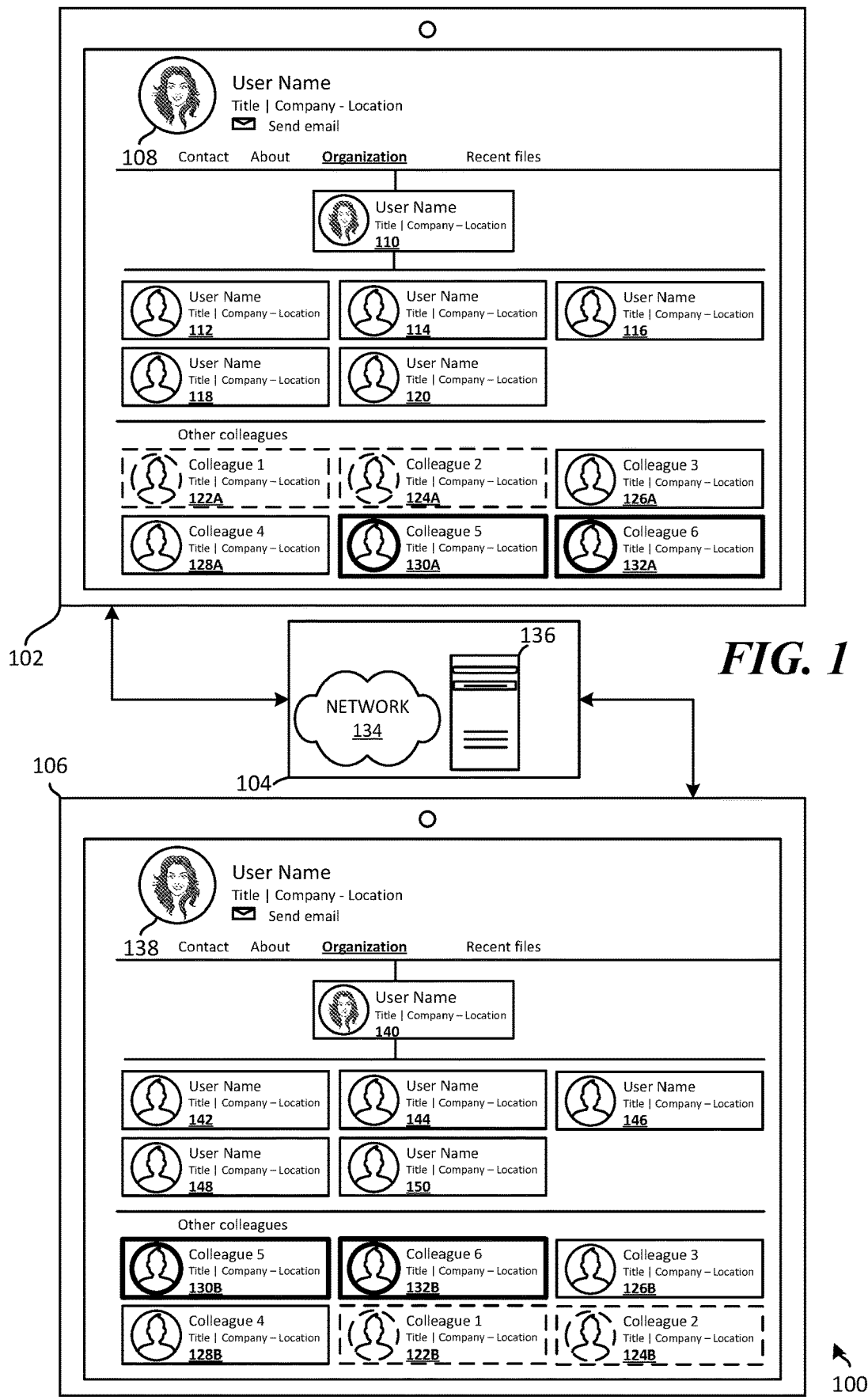
FIG. 1 is a schematic diagram of an exemplary environment for recommending a shared connection.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The various embodiments and examples described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the claims.

Generally, the present disclosure is directed to systems, methods, and devices for recommending one or more shared connections within one or more applications. According to examples, one or more users may be associated with one another, and that association may be displayable in one or more formats via a graphical user interface presenting one or more applications. Applications such as email applications, word processing applications, text communication applications, voice communication applications, meeting applications, and scheduling applications, may provide functionality that allows one or more application users that are connected or otherwise associated with one another through various means to view information regarding one another. In some examples users may be associated with one another by a social media application connection (e.g., a LinkedIn connection, a Facebook connection, an Instagram connection, etc.). In additional examples, application users may be related as working for a common entity (e.g., a business, a university, or other group), sharing a common computer network, sharing a computer network tenancy, communicating with one or another via one or more application, and/or providing an indication via one or more applications that they know one another (e.g., a friend request, a "add contact" input, etc.).

According to examples a plurality of communication signals amongst application users may be received. For example, signals regarding communications between a plurality of users may be received from applications such as email applications, calendar and appointment applications, voice call applications, video call applications, text communication applications, etc. Thus, a first application user may send an email to a second application user, a corresponding signal may be received, and a determination may be made based on that email, as well as other communications between those users, regarding a communication value to assign between those two users. According to examples, a value may be assigned to the received email based on one or more factors comprising: the length of the email, the content of the email, the number of other users that the email has listed in its "to" field, the number of other users that the email has listed in its "cc" field, etc. Those values may be utilized in calculating the communication value to assign between the two users.

In another example, a first application user may send a calendar invite to a second application user, a corresponding signal may be received, and a determination may be made based on that calendar invite, as well as other communications between those users, regarding a communication value to assign between those two users. According to examples, a value may be assigned to the received calendar invite based on one or more factors associated with the calendar invite comprising: the length of the scheduled calendar appointment, the content of the calendar invite, the number of additional application users included on the calendar invite, etc. Those values may be utilized in calculating the communication value to assign between the two users.

In additional examples, a first application user may call a second application user via a voice call application, a corresponding signal may be received, and a determination may be made based on that voice call, as well as other communications between those users, regarding a communication value to assign between those two users. According to examples, a value may be assigned to the received voice call based on one or more factors associated with the voice call comprising: whether the call was answered, the length of the call, the number of other application users that were invited to the call, etc. Those values may be utilized in calculating the communication value to assign between the two users.

In other examples, a first application user may call a second application user via a video call application, a corresponding signal may be received, and a determination may be made based on that video call, as well as other communications between those users, regarding a communication value to assign between those two users. According to examples, a value may be assigned to the received video call based on one or more factors associated with the video call comprising: whether the call was answered, the length of the call, the number of other application users that were invited to the call, etc. Those values may be utilized in calculating the communication value to assign between the two users.

In still other examples, a first application user may send a text communication via a text communication application (e.g., a chat application, an instant messaging application, a collaborative text communication application, etc.) to a second application user, a corresponding signal may be received, and a determination may be made based on that text communication, as well as other communications between those users, regarding a communication value to assign between those two users. According to examples, a value may be assigned to the received text communication based on one or more factors associated with the text communication comprising: the type of text communication, the length of the text communication, the content of the text communication, the number of other application users that were included on the text communication, the number of other application users that attended the text communication, etc. Those values may be utilized in calculating the communication value to assign between the two users.

Each communication type (e.g., email communications, calendar and appointment communications, voice call communications, video call communications, text communications, etc.) may have a single value assigned to it in calculating the communication value to assign between to two users. For example, only a number of each communication type between two application users may be utilized in calculating the communication value between the two users (e.g., a number of emails sent and received between two users, a number of calendar and appointment invites sent and received between two users, a number of voice calls made and answered and/or received between two users, a number of video calls made and answered and/or received between two users, a number of text communications and/or text communication application conversations started between two users). According to other examples, each type of communication between two users may receive a different value in calculating the communication value between the two users (e.g., an email communication between two users may be provided a first value in calculating the communication value between the two users, and a voice call communication between the two users may be provided a second value in calculating the communication value between the two users).

According to some examples, a connection group (e.g., a "working with" group, a "friends" group, a "frequent contact" group, etc.) may be determined for one or more application users. For example, a connection group for an application user may comprise each other application user that the application user has communicated with, each other application user that the application user has met a threshold communication value for, each other application user that the application user is associated with based on a shared communication network, each other application user that the application user is associated with based on a shared network and/or email domain, each other application user that the application user is associated with based on a shared network tenancy, each other application user that the application user is associated with based on a shared organization, each other application user that the application user is associated with based on a shared title within an organization, each other application user that the application user is associated with based on being on the same team of an organization, each other application user that the application user is associated with based on a shared location within an organization, etc. Additionally, one or more of the associations between the user and each other application user may be weighted and a determination may be made based on those weights as to whether each other application user is included in the application user's connection group.

A first application user may view information associated with a second application user. According to examples, the first user may be connected to the first application user according to the aspects described above. For example, a first application user sharing a network tenancy with a second application user may be provided with access to the second application user's profile, profile preview, contact card etc., which may be displayable in one or more formats via a graphical user interface presenting one or more applications that the first application user accesses. In some examples, displayed information associated with a viewed second application user may include second application user information comprising: an image of the second application user, the name of the second application user, contact information for the second application user (e.g., phone numbers, email contact information, social media contact information, physical location information, etc.), one or more organizations that the second user works for or is otherwise associated with, one or more organizational teams that the second user works in or is otherwise associated with, availability information, etc.

According to some examples, the information that a first application user views about a second application user may include a connection group (e.g., a "working with" group, a "friends" group, a "frequent contact" group, etc.) that the second application user is associated with. For example, a graphical user interface that the first application user is viewing the second application user's information on may display one or more additional users that the second user communicates with, or is otherwise associated with as described above.

In some examples, the methods, systems, and devices described herein may make a determination that it is desirable to display one or more user application profiles within the second user's connection group when the first application user views the second application user's profile. For example, a determination may be made that the first application user (the viewer) and the second application user (the viewee) are connected (e.g., connected via application communications with one another, connected via a shared network domain, connected via a shared network tenancy, etc.), but that a calculated communication value between the first and second application users is lower than a recommendation surfacing threshold value. A recommendation surfacing threshold value may be set, for which a communication value between two users must be below, in order to cause one or more shared application user profiles to be promoted within a display of the second application user's connection group when the first application user views the second application user's profile. Thus, if a communication value associated with a first and second user falls below the recommendation surfacing threshold based on one or more received communication signals associated with communications amongst the first and second user, one or more shared application user profiles may be caused to be promoted or otherwise recommended within the second application user's connection group when the first application user views the second application user's profile. Alternatively, if a communication value associated with a first and second user is above the recommendation surfacing threshold based on one or more received communication signals associated with communications amongst the first and second user (i.e., a determination is made that the first and second user know each other well), one or more shared application user profiles may not be caused to be promoted or otherwise recommended within the second application user's connection group when the first application user views the second application user's profile.

Thus according to some aspects, the methods, systems, and devices described herein, provide mechanisms for recommending shared connections between a first application user and a second application user to be displayed in the viewed second application user's connection group because the recommended shared connections may provide useful contextual information regarding who the second application user is and/or what roles the second application user has that are relevant to the first application user. Specifically, the methods, systems, and devices described herein promote or otherwise recommend a shared connection between a first application user and second application user based on the first and second application user being associated with one another, but not associated with one another to such a degree that promoting shared connections while the first application user views the second application user's profile would be unhelpful to the first application user because the first application user is already familiar with who the second application user is and/or what the second application user does. Thus, the recommendation surfacing threshold provides a mechanism for recommending one or more shared connections between a first application user (the viewer) and a second application user (the viewee) when a determination is made, based on a communication value associated with communications between the first application user and the second application user, that promoting or otherwise recommending one or more shared connections in association with the second user's application profile would be helpful to the first user.

According to examples where a communication value between the first and second application users is determined to be lower than a recommendation surfacing threshold value, a candidate set of user profiles to recommend to the first user (the viewer) may be identified. For example, a set of application users that are included within a shared connection set, or a set of users that are within a shared collaboration set, of the first application user and the second application user may be identified. That is, a set of application users may be determined that are associated with the first user (e.g., by way of one or more communication signals, by way of a shared network domain, by way of a shared network tenancy, etc.), and a subset of those users may be identified that are also associated with the second user (e.g., by way of one or more communication signal, by way of a shared network domain, by way of a shared network tenancy, etc.).

According to some examples, identifying a candidate set of user profiles to recommend to a first user may comprise calculating a first candidate communication value associated with communications between the first user and each of a plurality of users that are included in a shared connection and/or collaboration set of users that are shared amongst the first and second user. Calculating the first communication value between the first user and each of the plurality of users that are included in the connection and/or collaboration set of users that are shared amongst the first and second users may comprise collecting/receiving a plurality of communication signals between the first user and each of the plurality of users in the shared connection and/or collaboration set.

In some examples, identifying a candidate set of user profiles to recommend to a first user may also comprise calculating a second communication value associated with communications between the second user and each of the plurality of users that are included in a shared connection and/or collaboration set of users that are shared amongst the first and second users. Calculating the second communication value between the second user and each of the plurality of users that are included in the shared connection and/or collaboration set of users that are shared amongst the first and second users may comprise collecting/receiving a plurality of communication signals between the second user and each of the plurality of users in the shared connection and/or collaboration set.

In some examples, identifying the candidate set of user profiles to recommend to a first user may comprise identifying a subset of candidate user profiles that meet a minimum first candidate communication value and a minimum second candidate communication value. That is, the candidate set of user profiles may be filtered to a group of application user profiles that: communicate with the first and second application users, communicate with the first application user to a sufficient degree such that received communication signals associated with the first application user and each of the subset of user profiles meet a minimum first candidate communication value, and communicate with the second application user to a sufficient degree such that received communication signals associated with the second application user and each of the subset of user profiles meet a minimum second candidate communication value.

According to some examples the first candidate communication value and the second candidate communication value may be the same (e.g., the first application user and a third application user must have at least 50 common communications amongst one another, and the second application user and third application user must have at least 50 common communications amongst one another). According to other examples, the first candidate communication value and the second candidate communication value may be different (e.g., the first application user and the third application user must have at least 50 communications amongst one another, and the second application user and the third application user must have at least 75 common communications amongst one another).

According to other examples, the candidate set of user profiles may be filtered based on being included in a top percentage of candidates based on the first candidate communication value (e.g., the third application user is within the top X % of other candidates for the first user) and the second candidate communication value (e.g., the third application user is within the top X % or Y % of other candidates for the second user).

In some examples, the candidate set of user profiles may be ranked according to an importance value associated with each user of the candidate set of user profiles. The importance value may comprise a metric determined from the first candidate communication value, and the second candidate communication value. For example, one or more of the mechanisms described above may be utilized in determining a rank for each of the plurality of application users that are included in the candidate set of profiles based on a calculation that takes into account common communications between the first application user and each of the plurality of application users included in the candidate set and/or the communications between the second application user and each of the plurality of application users included in the candidate set.

According to examples, a connection group (e.g., a "working with" group, a "friends" group, a "frequent contact" group, etc.) for a second application user (the viewee), or a portion thereof, may be caused to be displayed on graphical user interface when a first application user (the viewer) accesses the second application user's profile. According to some aspects, one or more of the top ranked candidate profiles may be caused to be promoted on the graphical user interface. In some examples, one or more top ranked candidate profiles may be displayed at the top of the second application user's connection group. In other aspects, one or more of the top ranked candidate profiles may be displayed larger than other profiles and/or highlighted (e.g., bold lettering, bold profile outlining, colored lettering, colored profile outlining, etc.) in order to increase their prominence on the graphical user interface. In some examples, the importance value, or a rank of one or more of the top ranked candidate profiles may be displayed in association with those corresponding profiles (e.g., importance value of 0.89, 1 of 50 candidate user profiles, etc.). In other examples, a communication value as it relates to the first application user (the viewer) and one or more corresponding top ranked candidate profiles may displayed in association with each of those corresponding profiles. Additionally or alternatively, a communication value as it relates to the second application user (the viewee) and one or more corresponding ranked candidate profiles may be displayed in association with each of those corresponding profiles.

Turning specifically to the examples shown in the figures, FIG. 1 is a schematic diagram of an exemplary environment 100 for recommending a shared connection. Exemplary environment 100 includes graphical user interface 102, network and processing context 104, and graphical user interface 106.

Graphical user interface 102 has been accessed from one or more applications associated with a first application user's application account. The graphical user interface 102 shows a second application user's profile that is being viewed. The second application user's profile includes a profile picture 108 of the second user, as well as the second application user's name, title, company, location, and a link to send an email to the second application user.

Below the second application user's profile on the graphical user interface 102, a connection group for the second application user is displayed. The working with group is comprised of other application users (application users 112, 114, 116, 118, and 120) that the second application user is associated based on one or more communications exchanged between the second application user and each of the application users in the displayed connection group. In some examples, the other application users 112-120 may be displayed hierarchically according to their respective roles in relation to the second application user.

Below the connection group on the graphical user interface 102, an "other colleagues" group for the second application user is displayed less prominently than the connection group above it. The other colleagues group is comprised of other application users (application users 122A, 124A, 126A, 128A, 130A, and 132A) that the second application user is connected to. According to examples, the users included in the other colleagues group (users 122A-132A) may be determined from analyzing one or more communication signals (e.g., shared emails, shared meeting invites, shared instant message conversations, shared audio application communications, shared video application communications, etc.) between the second application user and each respective user associated with the organization that the second user works at. For example, the one or more communication signals may be communicated to server computing device 136, via network 134, for processing and analysis of those signals. In some examples, server computing device 136 may receive the one or more communication signals contemporaneously with an associated application user communication (e.g., a communication signal is sent to server computing device 136 at the time that the communication occurs). In other examples, server computing device 136 may receive the one or more communication signals at timed intervals (e.g., communication signals may be archived and/or sent to server computing device 136 at timed intervals, such as one week, one month, one year, etc.).

The users included in the other colleagues group (users 122A-132A) may be determined from server computing device's 136 analysis of one or more received communication signals between the second application user and application users inside and outside of the organization. The users 122A-132A included in the other colleagues group displayed on graphical user interface 102 are sorted according to a corresponding communication value rank for each of those users 122A-132A. The communication value for each of users 122A-132A may be determined by server computing device 136 based on a calculation that utilizes the received communication signals between each of users 122A-132A and the second application user. For example, if user 122A (colleague 1) has exchanged 100 emails with the second user (with no other types of communications being exchanged), and user 132A (colleague 6) has exchanged 50 emails with the second user (with no other types of communications being exchanged), user 122A would have a higher communication value assigned to her than user 132A. Thus, user 122A is displayed in a more prominent position (e.g., the top left position) than user 132A within the other colleagues group on graphical user interface 102.

According to examples, server computing device 136 may calculate communication values for each of the other users 122A-132A in the other colleagues group by performing one or more of the following operations: analyzing communication signals between each other user and the second user over a set period of time (e.g., one week, one month, one year, etc.), weighting each type of communication between the other users and the second user (e.g., a first weight for email communications, a second weight for instant messaging communications, a third weight for voice application communications, etc.), weighting communication signals according to the content of the communication, and weighting communication signals according to the length of a communication.

Graphical user interface 106 provides a similar display of information associated with the second user as provided by graphical user interface 102. However, rather than arranging the other users included in the other colleagues group according to their respective communication value with the second user, they are recommended (i.e., arranged and ranked) based on their relevance not only to the second user, but also to a first user (the viewer).

Thus, the users included in the other colleagues group (users 122B-132B) displayed on graphical user interface 106 may be determined from analyzing one or more communication signals (e.g., shared emails, shared meeting invites, shared instant message conversations, shared audio application communications, shared video application communications, etc.) between the second application user (the viewee) and each respective user that the second user is connected to, as well as the first application user (the viewer) and each respective user that the first application user is connected to. For example, the one or more communication signals may be communicated to server computing device 136, via network 134, for processing of those signals. In some examples, server computing device 136 may receive the one or more communication signals contemporaneously with associated application user communication (e.g., a communication signal is sent to server computing device 136 at the time that the communication occurs). In other examples, server computing device 136 may receive the one or more communication signals at timed intervals (e.g., communication signals may be archived and/or sent to server computing device 136 at timed intervals, such as one week, one month, one year, etc.).

The users included in the other colleagues group (application users 122B-132B) may be determined from server computing device's 136 analysis of one or more received communication signals between the second application user and application users inside and outside of the organization, as well as server computing device's 136 analysis of one or more received communication signals between the first application user and application users inside and outside of the organization. The application users 122B-132B included in the other colleagues group displayed on graphical user interface 106 are sorted according to a metric determined from a corresponding communication value rank between the second application user and each of those other application users (122B-132B), and a corresponding communication value rank between the first application user and each of those other application users (122B-132B). The metric used for sorting the other application users 122B-132B is also referred to herein as an "importance value", which is assigned to each of the other application users (122B-132B) based on a calculation that includes a communication value between the second application user and each other application user, as well as a communication value between the first application user and each other application user. For example, although a communication value between the second application user and application user 130B may be lower than each communication value between the second application user and application users 122B-128B, the inclusion of the communication value between the first application user (the viewer) and application user 130B in the calculation of the importance value for application user 130B increases its rank above each of the other application users. Thus, the profile information for application user 130B is displayed most prominently on graphical user interface 106 (in this case being displayed in the top right corner of the other colleagues list) based on it having the highest importance value amongst each of the other application users in the other colleagues group (application user 132B, application user 126B, application user 128B, application user 122B, and application user 124B).

According to some examples, server computing device 136 may only calculate communication values between the first application user (the viewer) and the other application users (e.g., users 122B-132B) included in the other colleagues group, and subsequently rank those other users according to corresponding importance values for promoting one or more of those user profiles in the other colleagues group, upon making a determination that it is desirable to display one or more user application profiles within the second user's other colleagues group (otherwise referred to herein as "connection group") when the first application user views the second application user's profile.

For example, server computing device 136 may make a determination that the first application user and the second application user are connected (e.g., connected via application communications with one another, connected via a shared network domain, connected via a shared network tenancy, etc.), but that a calculated communication value between the first and second application users is lower than a recommendation surfacing threshold value. That is, a recommendation surfacing threshold may be set, for which a communication value between two application users must be below, in order to cause one or more shared application user profiles to be displayed and/or promoted or otherwise recommended. Thus, if server computing device 136 determines that a communication value calculated between the first and second application users is below the recommendation surfacing threshold based on one or more received communication signals associated with communications amongst the first and second application users, one or more shared application profiles may be caused to be displayed and/or promoted in association with the second application user's profile when viewed by the first application user. Alternatively, if server computing device 136 determines that a communication value associated with the first and second application users is above the recommendation surfacing threshold based on one or more received communication signals associated with communications amongst the first and second application users (i.e., a determination is made that the first and second application users know each other well), one or more shared application user profiles may not be caused to be displayed and/or promoted in associated with the second application user's profile when viewed by the first application user.

According to examples, each of the applications that a user's profile is associated with may comprise user-selectable privacy controls that allow a user to indicate which, if any, communication signals to allow computing devices associated with the methods, systems, and devices described herein to collect. For example, an application user may be prompted when she creates her application profile to select which, if any, communications she would like to have monitored for signal collection. Similarly, an application user may be prompted when she creates her application profile to select which communication signals she would like to have collected by the methods, systems, and devices described herein. For example, a user may select an option to not have any of her communication signals collected. Alternatively, a user may select an option to only have a number communications between herself and other application users to be counted (e.g., count the number of emails that the user sends to each of a plurality of other application users, count the number of voice application calls that the user initiates with each of a plurality of other application users, etc.). In still other examples, a user may select an option to have the length and/or content of her communications collected or not collected. Each of the above-described privacy controls may similarly be selectable in a settings menu provided by one or more applications that a user's application profile is associated with.

Figure 2:
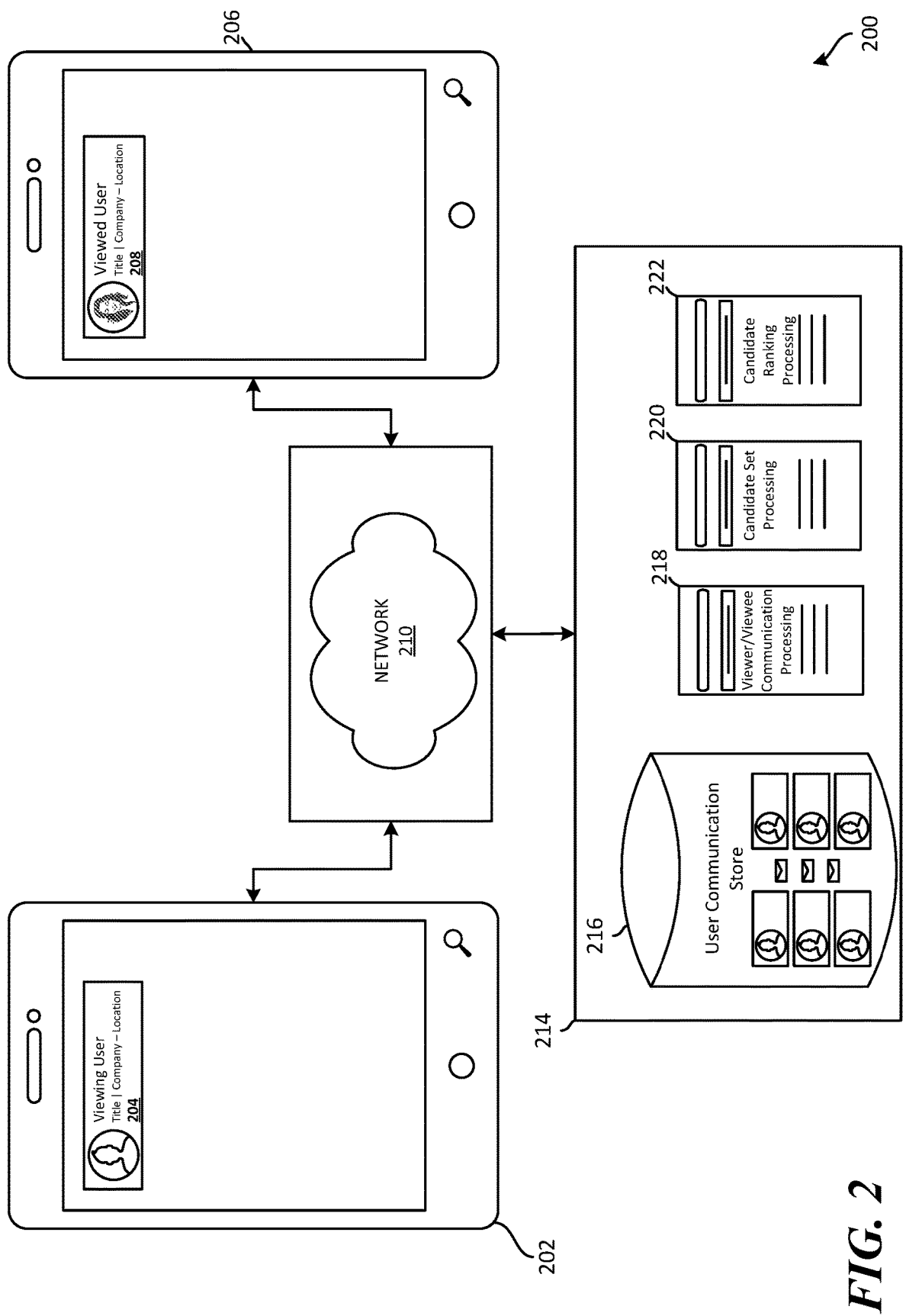
FIG. 2 is a schematic diagram of an exemplary environment for analyzing one or more signals from user communications and recommending a shared connection.

FIG. 2 is a schematic diagram of an exemplary environment 200 for analyzing one or more signals from application user communications and recommending a shared connection. Exemplary environment 200 includes first computing device 202, which is a computing device used by a first application user. A preview of the first application user's profile 204 is shown on the graphical user interface of computing device 202. Exemplary environment 200 also includes second computing device 206, which is a computing device used by a second application user. A preview of the second application user's profile 208 is shown on the graphical user interface of computing device 206.

Exemplary environment 200 also includes network 210, by which computing devices 202 and 206 may communicate with one another, as well as with one or more computing device in communication processing and storage sub-environment 214 (e.g., server computing device 218, server computing device 220, and server computing device 222).

The first application user and the second application user may communicate with one another via one or more applications and network 210. For example, the first and second user may exchange one or more emails with one another via an email application, first and second user may communicate with one another via an instant messaging application, first and second user may communication with one another via audio and video applications, etc. In some examples, one or more communication signals associated with each communication between the first and second user may be provided, via network 210, to communication processing and storage sub-environment 214. In some examples, the one or more communication signals may be transferred to communication processing and storage sub-environment 214 contemporaneously with the occurrence of the communication. In other examples, the one or more communication signals may be transferred to communication processing and storage sub-environment 214 at timed intervals, such as every week, every month, every year, etc.

In some examples, the one or more communication signals may be transferred to a user communication store, such as user communication store 216. User communication store 216 may comprise communication signals from a plurality of users associated with one or more applications. For example, user communication store 216 may comprise communication signals associated with communications between the first user and the second user, as well as a plurality of other application users, which may or may not be shared connections of the first user and the second user.

In some examples, the first user may be a viewer of the second user's application profile. In such an example, the one or more communication signals from the first and second user may be provided from user communication store 216 to server computing device 218, which may perform one or more operations associated with determining a communication value between the first and second user, and determining whether that communication value is lower than a recommendation surfacing threshold value, such that one or more candidate user profiles may be promoted on a graphical user interface that the first user has accessed the second user's profile from.

In other examples, the first and second users may represent application users generally (i.e., not necessarily a profile viewer and a profile viewee), that may communicate with one or more other application users. For example, the first user may communicate, via one or more applications, with one or more other application users and one or more communication signals from those communications may be transferred, via network 210, to communication processing and storage sub-environment 214. Similarly, the second user may communicate, via one or more applications, with one or more other application users and one or more communication signals from those communications may be transferred, via network 210, to communication processing and storage sub-environment 214. It should be understood that there may be a plurality of application users that communicate with one another, and corresponding signals for each of those application users may be similarly transferred, via network 210, to communication processing and storage sub-environment 214.

If a determination is made by server computing device 218, that a calculated communication value between a viewing user (e.g., the user associated with the preview of the first application user's profile 204) and a viewed user (e.g., the user associated with the preview of the second application user's profile 208) is lower than a recommendation surfacing threshold value, such that one or more candidate user profiles may be promoted on a graphical user interface that the first user has accessed the second user's profile from, server computing device 220 may perform one or more operations associated with identifying a candidate set of user profiles to recommend to the first user. For example, a set of application users that are associated with the first and second application users may be identified.

The set of application users may be associated with the first and second application users in that they share a computer network domain with the first and second application users, they share an email domain with the first and second application users, they share a common organization in an application profile with the first and second application users, one or more communication signals indicate that they have communicated with the first and second application users, one or more communication signals indicate that they have reached a communication threshold value with the first and second users, and/or they are otherwise associated within at least one application associated with the first and second users' application profiles (e.g., they have been designated by a system administrator as being associated with the first and second users, they have accepted a friend request from the first and second users, etc.).

Upon identifying a set of application users that are associated with the first and second application users, a communication value between each application user in the set of application users and the first application user may be calculated by server computing device 220. Similarly, server computing device 220 may calculate a communication value between each application user in the set of application users and the second application user. That is, server computing device 220 may receive one or more communication signals associated with communications between each application user of the set of application users and the first application user. Based on the one or more received communication signals, server computing device 220 may calculate a communication value between each of the application users of the set of application users and the first application user. Likewise, server computing device 220 may receive one or more communication signals associated with communications between each application user of the set of application users and the second application user. Based on the one or more received communication signals, server computing device 220 may calculate a communication value between each of the application users of the set of applications and the second application user. From those communication values (i.e., a communication value between each application user of the set and the first user, and a communication value between each application user of the set and the second user), an importance value may be assigned to each application user of the set, and or corresponding application profiles for those users.

According to some examples, the candidate set of user profiles to recommend to the first user may include only those application users of the set that have an importance value assigned to them of above a certain value, or score. In other examples, the candidate set of user profiles may include only those application users of the set for which a communication value between themselves and the first user is above a certain value, and for which a communication value between themselves and the second user is above a certain value. In additional examples, the candidate set of user profiles may include only those application users of the set which are above a certain rank of the set of user profiles based on a communication value between the first user (e.g., profiles that are in the top 5 or 10 application profiles of the set based on a calculated communication value with the first user), and above a certain rank of the set of user profiles based on a communication value between the second user (e.g., profiles that are in the top 5 or 10 application profiles of the set based on a calculated communication value with the second user). In other examples, the candidate set of user profiles may include only those application users of the set which are above a certain percentage of the set of user profiles based on a communication value between the first user (e.g., profiles that are in the top five or ten percent of the set based on a calculated communication value with the first user), and above a certain percentage of the set of user profiles based on a communication value between the second user (e.g., profiles that are in the top five or ten percent of the set based on a calculated communication value with the second user).

Once a candidate set of application users has been identified, server computing device 222 may perform one or more operations associated with ranking each of the candidate user profiles for recommending on a graphical user interface that the first user is viewing the second application user's profile on. In some examples, the candidate user profiles may be ranked according to importance relative to the first application user (the viewer). In other examples, the candidate user profiles may be ranked according to relative importance to the second application user (the viewee). In additional examples, the candidate user profiles may be ranked based on a combination of relative importance to the first application user and the second application user. In one example, the sum of a candidate application user's rank with regard to importance to the first user (e.g., 1st, 2nd, etc.) and the candidate application user's rank with regard to importance to the second user (e.g., 1st, 2nd, etc.) may be calculated and a subsequent rank applied to the application user. In another example, an importance value associated with each user included in the candidate set of user profiles may be assigned to each candidate profile and those values may be used to rank each user of the candidate set. For example, the importance value may comprise a metric determined for each application user of the candidate set based on a communication value between each of those users and the first user, and a communication value between each of those users and the second user.

Upon ranking the candidate user profiles, one or more highest ranked candidate user profiles may be caused to be promoted on a graphical user interface that the first user (the viewer) is viewing the second user's (the viewee) profile on. In some examples, the one or more top ranked candidate user profiles may be presented at the top of set of common application profiles, or a set of "other colleagues", on the graphical user interface. In other examples, the one or more top ranked candidate user profiles may be blended in a random order with a set of common application profiles, or a set of "other colleagues", on the graphical user interface. In still other examples, the one or more top ranked candidate user profiles may be caused to be displayed on or in association with a section of the second user's profile that is separate from common application profiles and "other colleagues". In additional examples, only the one or more top ranked candidate user profiles may be caused to be displayed on or in association with the second user's profile. In some examples, the one or more top ranked candidate profiles may be indicated as being the top ranked candidate profiles.

Figure 3:
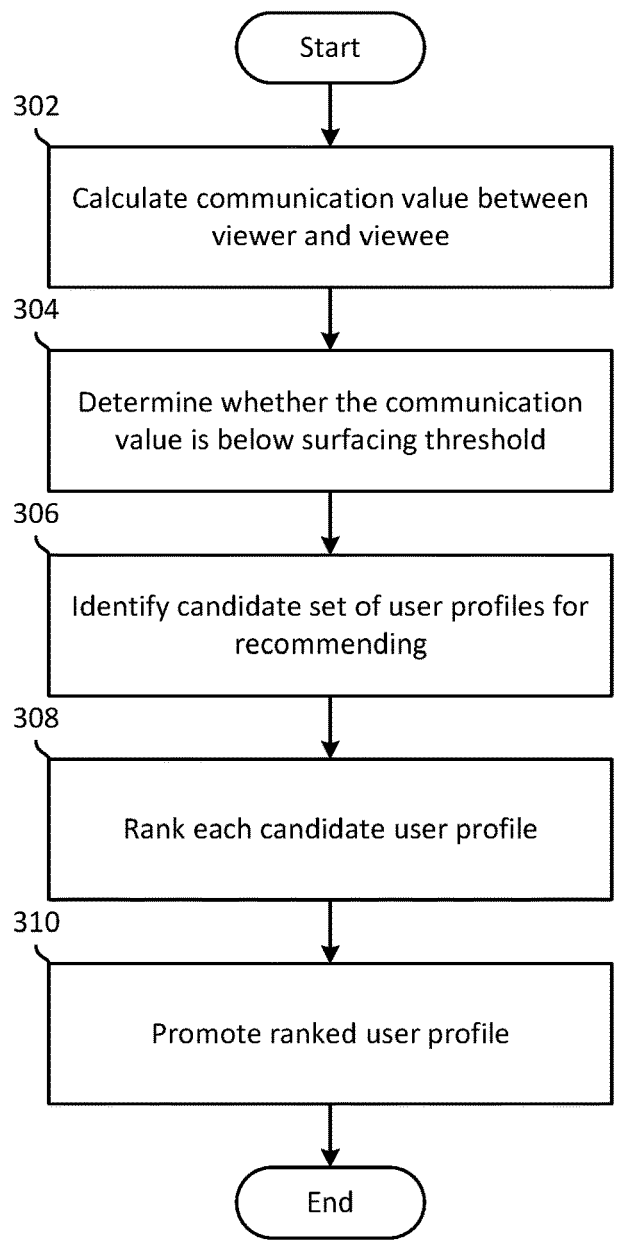
FIG. 3 is an exemplary method for recommending a shared connection.

FIG. 3 is an exemplary method 300 for recommending a shared connection. The method 300 begins at a start operation and flow continues to operation 302 where a communication value between a first application user (an application profile viewer) and a second application user (an application profile viewee) is calculated. For example, the first application user may access the second application user's profile, or contact card, via one or more applications (e.g., an email application, a calendar and/or scheduling application, an instant messaging application, an audio communication application, a video communication application, etc.), and one or more communication signals associated with application communications between the first application user and the second application user may be received. The one or more communication signals may comprise information related to the application communications, including a number of communications exchanged between the first application user and the second application user, the type of communications exchanged between the first application user and the second application user, the duration of communications exchanged between the first application user and the second application user, and the content of communications exchanged between the first application user and the second application user, among others. From the one or more received communication signals, a communication value between the first application user and the second application user may be calculated.

According to examples, the calculation of the communication value between the first application user and the second application user may occur after or contemporaneously with the first user accessing the second user's profile, or the determination may occur before the first application user accesses the second application user's profile.

From operation 302 flow continues to operation 304 where a determination is made as to whether the calculated communication value is below a threshold for surfacing one or more shared connection recommendations. The surfacing threshold provides a mechanism for identifying relationships between a viewing application user and viewee application user in which it would be useful to cause one or more shared connection recommendations between the first and second application users to be displayed and/or promoted on a graphical user interface on which the viewing application user is viewing the viewee's profile. That is, if the first application user (the viewer) is well acquainted with the second application user (the viewee), it is likely that the first application user does not need common connections to be surfaced on a corresponding graphical user interface because the first application user is likely already familiar with common connections that may be useful in providing information about the second application user.

According to examples, the determination of whether the calculated communication value is below a threshold for surfacing one or more shared connection recommendation may occur after or contemporaneously with the first user accessing the second user's profile, or the determination may occur before the first application user accesses the second application user's profile.

From operation 304 flow continues to operation 306 where a candidate set of user profiles for recommending (i.e., promoting) via a graphical user interface that the first user has accessed the second application user's profile on is identified. According to examples, the candidate set of user profiles may be identified from a set of application users that are each associated with the first application user and the second application user. That is, one or more communication signals associated with each application user of a set of application users that are associated with the first and second application users may be received, a first communication value may be calculated between each of those users and the first application user, and a second communication value may be calculated between each of those users and the second application user.

In some examples, the candidate set of application profiles may comprise only those shared connections of the set that are in the top X number of users for the first user (based on corresponding first communication values), and those shared connections of the set that are in the top Y number of users for the second user (based on corresponding second communication values). In other examples, a score may be calculated based on the first and second communication values for each application user of the set of application users that are associated with the first application user and the second application user, and that score may be used to identify the candidate set of user profiles. In other examples, the candidate set of profiles may be identified by summing the rank of each of the shared connections of the set based on corresponding first and second communication values.

According to examples, the identification of the candidate set of user profiles may occur after or contemporaneously with the first user accessing the second application user's profile, or the determination may occur before the first application user accesses the second application user's profile.

From operation 306 flow continues to operation 308 where each candidate user profile is ranked. According to examples, each of the candidate user profiles may be ranked for recommending on a graphical user interface. In some examples, the candidate user profiles may be ranked according to importance relative to the first application user (the viewer). In other examples, the candidate user profiles may be ranked according to importance relative to the second application user (the viewee). In additional examples, the candidate user profiles may be ranked based on a combination of relative importance to the first application user and the second application user. In one example, the sum of a candidate application user's rank with regard to importance to the first user (e.g., 1st, 2nd, etc.) and the candidate application user's rank with regard to importance to the second user (e.g., 1st, 2nd, etc.) may be calculated and a subsequent rank applied to the application user. In another example, an importance value associated with each user included in the candidate set of user profiles may be assigned to each candidate profile and those values may be used to rank each user of the candidate set. For example, the importance value may comprise a metric determined for each application user of the candidate set based on a communication value between each of those users and the first user, and a communication value between each of those users and the second user.

From operation 308 flow continues to operation 310 where one or more top ranked candidate profiles are promoted on a graphical user interface. In some examples the one or more top ranked candidate user profiles may be presented at the top of a set of common application profiles, or a set of "other colleagues" on the graphical user interface. In other examples, the one or more top ranked candidate user profiles may be blended in a random order with a set of common application profiles, or a set of "other colleagues", on the graphical user interface. In still other examples, the one or more top ranked candidate user profiles may be caused to be displayed on or in association with a section of the second application user's profile that is separate from common application profiles and "other colleagues". In additional examples, only the one or more top ranked candidate user profiles may be caused to be displayed on or in association with the second application user's profile. In other examples, the one or more top ranked profiles may be indicated in their display as being the top ranked candidate profiles.

From operation 310 flow moves to an end operation and the method 300 ends.

Figure 4:
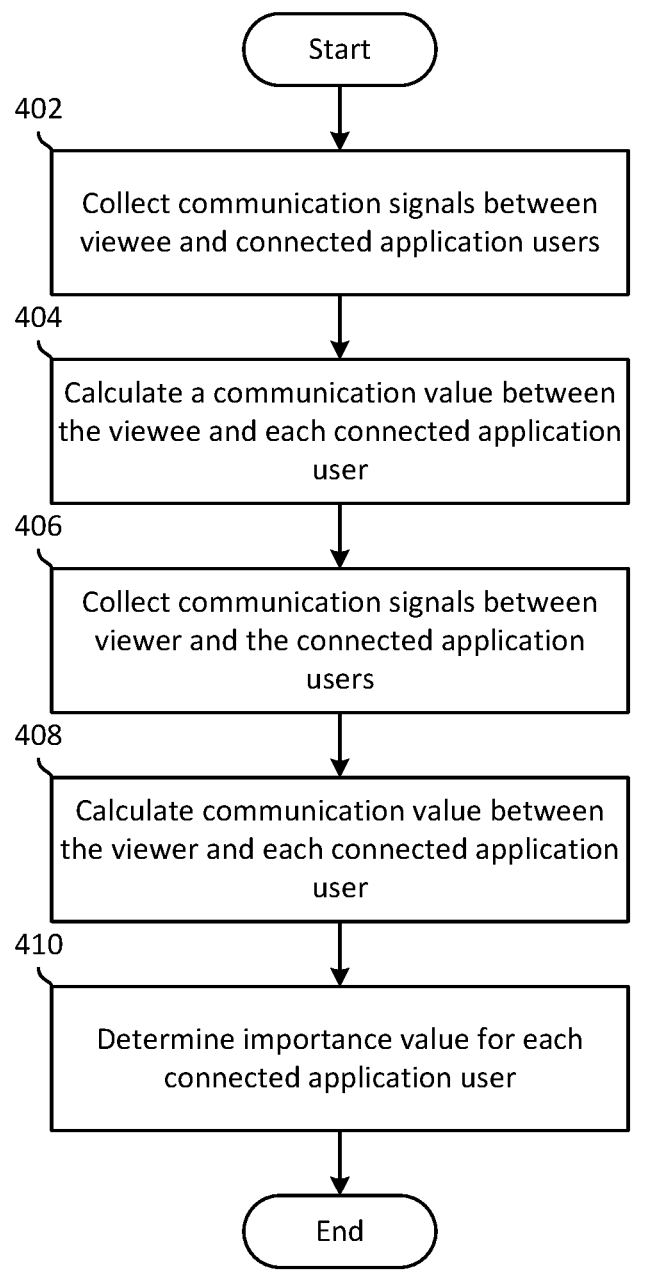
FIG. 4 is an exemplary method for identifying and sorting a candidate set of users in recommending a shared connection.

FIG. 4 is an exemplary method 400 for identifying and sorting a candidate set of users in recommending a shared connection. The method 400 begins at a start operation and flow continues to operation 402 where one or more communication signals from communications between a viewee application user and one or more connected other application users are collected. The one or more communication signals from the other connected application users may include information related to the one or more connected other application users' application communications with the viewee, including: a number of emails exchanged with the viewee, a number of calendar and/or appointment application invites exchanged with the viewee, a number of instant messaging conversations with the viewee, a number of voice communication application conversations with the viewee, a number of audio communication application conversations with the viewee, length of communications with the viewee, the content of communications with the viewee, etc.

From operation 402 flow continues to operation 404 where a communication value between the viewee and each connected application user is calculated. For example, received communication signals from communications between each connected application user and the viewee may be analyzed and used in calculating a corresponding communication value between each connected application user and the viewee. According to some examples, each received communication signal may have the same weight associated with it in calculating a corresponding communication value. According to other examples, communication signals may be weighted differently according to communication type, communication length (time, number of words, etc.), communication content, other application users included in a communication, etc.

From operation 404 flow continues to operation 406 where one or more communication signals from communications between a profile viewer and one or more connected other application users are collected. According to examples, the connected other application users are shared connections between the viewee and the viewer. The one or more communication signals from the other connected application users may include information related to the one or more connected other application users' application communications with the profile viewer, including: a number of emails exchanged with the profile viewer, a number of calendar and/or appointment application invites exchanged with the profile viewer, a number of instant messaging conversations with the profile viewer, a number of voice communication application conversations with the profile viewer, a number of audio communication application conversations with the profile viewer, length of communications with the profile viewer, the content of communications with the viewer, etc.

From operation 406 flow continues to operation 408 where a communication value between the profile viewer and each connected application user is calculated. For example, received communication signals from communications between each connected application user and the profile viewer may be analyzed and used in determining a corresponding communication value between each connected application user and the profile viewer. According to some examples, each communication signal may have the same weight associated with it in calculating a corresponding communication value. According to other examples, communication signals may be weighted differently according to communication type, communication length (time, number of words, etc.), communication content, other application users included in a communication, etc.

Moving from operation 408 flow continues to operation 410 where an importance value for each connected application user is calculated. The importance value may comprise a metric determined based on a corresponding communication value that was calculated between each connected application user and the viewee, and a corresponding communication value that was calculated between each connected application user and the profile viewer. According to additional examples, the connected application users may be sorted according to their relative level of connectedness to the viewee based on the calculated importance values. In other examples, the connected application users may be sorted according to their relative level of connectedness to the profile viewer based on the calculated importance values. In some examples, the connected application users may be sorted according to their relative level of connectedness to the profile viewer and the viewee based on the calculated importance values. In still other examples, the connected application users may be sorted according to their relative level of connectedness to the profile viewer or the viewee based only on a corresponding communication value that has been calculated based received communication signals.

From operation 410 flow continues to and end operation, and the method 400 ends.

Figure 5:
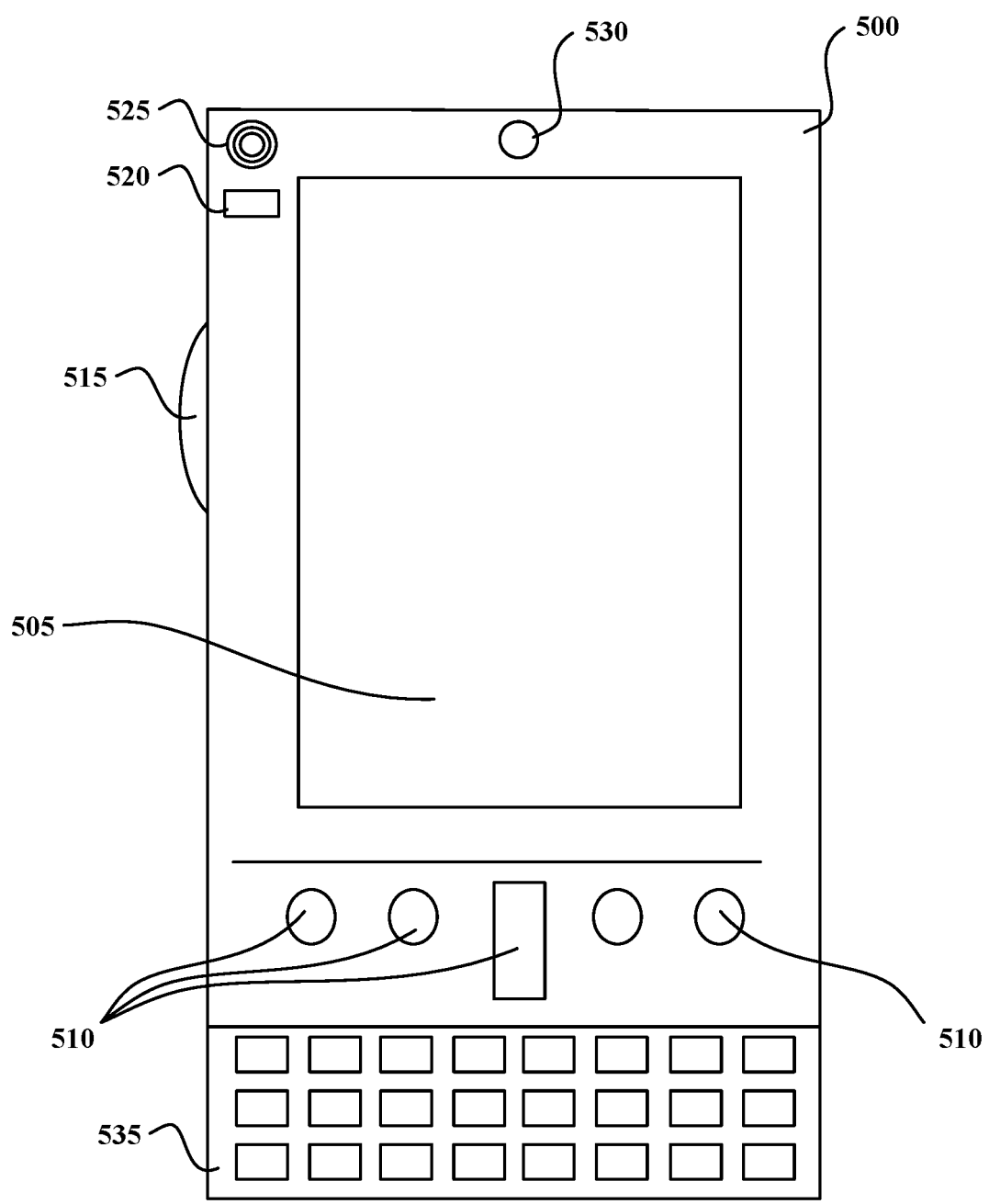
FIGS. 5 and 6 are simplified diagrams of a mobile computing device with which aspects of the disclosure may be practiced.
Figure 6:
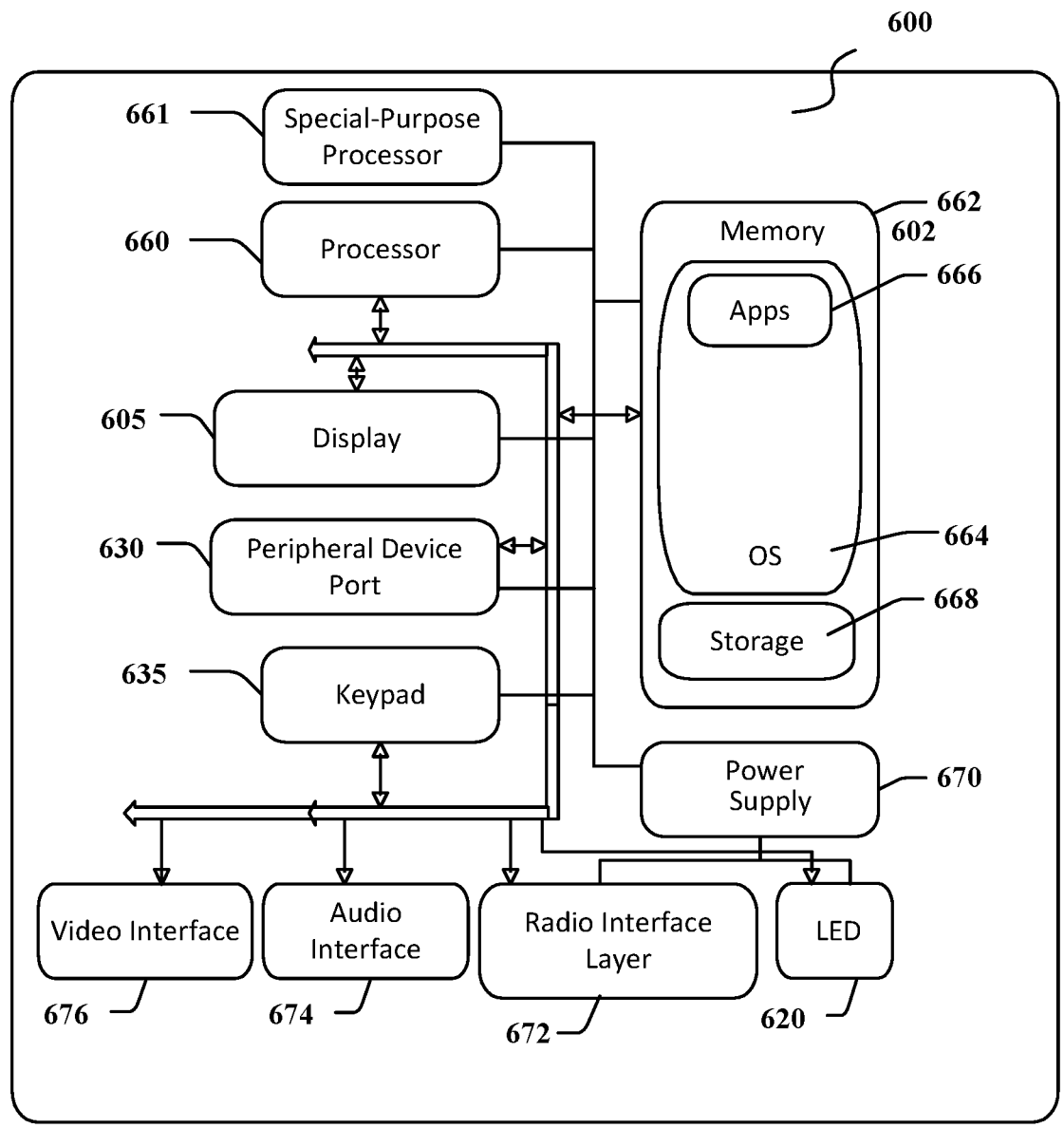

FIGS. 5 and 6 illustrate a mobile computing device 500, for example, a mobile telephone, a smart phone, wearable computer (such as a smart watch), a tablet computer, an e-reader, a laptop computer, and the like, with which embodiments of the disclosure may be practiced. In some aspects, the client may be a mobile computing device. With reference to FIG. 5, one aspect of a mobile computing device 500 for implementing the aspects is illustrated. In a basic configuration, the mobile computing device 500 is a handheld computer having both input elements and output elements. The mobile computing device 500 typically includes a display 505 and one or more input buttons 510 that allow the user to enter information into the mobile computing device 500. The display 505 of the mobile computing device 500 may also function as an input device (e.g., a touch screen display). If included, an optional side input element 515 allows further user input. The side input element 515 may be a rotary switch, a button, or any other type of manual input element. In alternative aspects, mobile computing device 500 may incorporate more or less input elements. For example, the display 505 may not be a touch screen in some embodiments. In yet another alternative embodiment, the mobile computing device 500 is a portable phone system, such as a cellular phone. The mobile computing device 500 may also include an optional keypad 535. Optional keypad 535 may be a physical keypad or a "soft" keypad generated on the touch screen display. In various embodiments, the output elements include the display 505 for showing a graphical user interface (GUI), a visual indicator 520 (e.g., a light emitting diode), and/or an audio transducer 525 (e.g., a speaker). In some aspects, the mobile computing device 500 incorporates a vibration transducer for providing the user with tactile feedback. In yet another aspect, the mobile computing device 500 incorporates input and/or output ports, such as an audio input (e.g., a microphone jack), an audio output (e.g., a headphone jack), and a video output (e.g., a HDMI port) for sending signals to or receiving signals from an external device.

FIG. 6 is a block diagram illustrating the architecture of one aspect of a mobile computing device. That is, the mobile computing device 600 can incorporate a system (e.g., an architecture) 602 to implement some aspects. In one embodiment, the system 602 is implemented as a "smart phone" capable of running one or more applications (e.g., browser, e-mail, calendaring, contact managers, messaging clients, games, and media clients/players). In some aspects, the system 602 is integrated as a computing device, such as an integrated personal digital assistant (PDA) and wireless phone.

One or more application programs 666 may be loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. The system 602 also includes a non-volatile storage area 668 within the memory 662. The non-volatile storage area 668 may be used to store persistent information that should not be lost if the system 602 is powered down. The application programs 666 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600, including the instructions for recommending a shared connection for display in association with an application user's profile.

The system 602 has a power supply 670, which may be implemented as one or more batteries. The power supply 670 might further include an external power source, such as an AC adapter or a powered docking cradle that supplements or recharges the batteries.

The system 602 may also include a radio interface layer 672 that performs the function of transmitting and receiving radio frequency communications. The radio interface layer 672 facilitates wireless connectivity between the system 602 and the "outside world," via a communications carrier or service provider. Transmissions to and from the radio interface layer 672 are conducted under control of the operating system 664. In other words, communications received by the radio interface layer 672 may be disseminated to the application programs 666 via the operating system 664, and vice versa.

The visual indicator 520 may be used to provide visual notifications, and/or an audio interface 674 may be used for producing audible notifications via the audio transducer 525. In the illustrated embodiment, the visual indicator 520 is a light emitting diode (LED) and the audio transducer 525 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 525, the audio interface 674 may also be coupled to a microphone to receive audible input, such as to facilitate a telephone conversation. In accordance with embodiments of the present disclosure, the microphone may also serve as an audio sensor to facilitate control of notifications, as will be described below. The system 602 may further include a video interface 676 that enables an operation of an on-board camera 530 to record still images, video stream, and the like.

A mobile computing device 600 implementing the system 602 may have additional features or functionality. For example, the mobile computing device 600 may also include additional data storage devices (removable and/or non-removable) such as, magnetic disks, optical disks, or tape. Such additional storage is illustrated in FIG. 6 by the non-volatile storage area 668.

Data/information generated or captured by the mobile computing device 600 and stored via the system 602 may be stored locally on the mobile computing device 600, as described above, or the data may be stored on any number of storage media that may be accessed by the device via the radio interface layer 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio interface layer 672 or via a distributed computing network. Similarly, such data/information may be readily transferred between computing devices for storage and use according to well-known data/information transfer and storage means, including electronic mail and collaborative data/information sharing systems.

Figure 7:
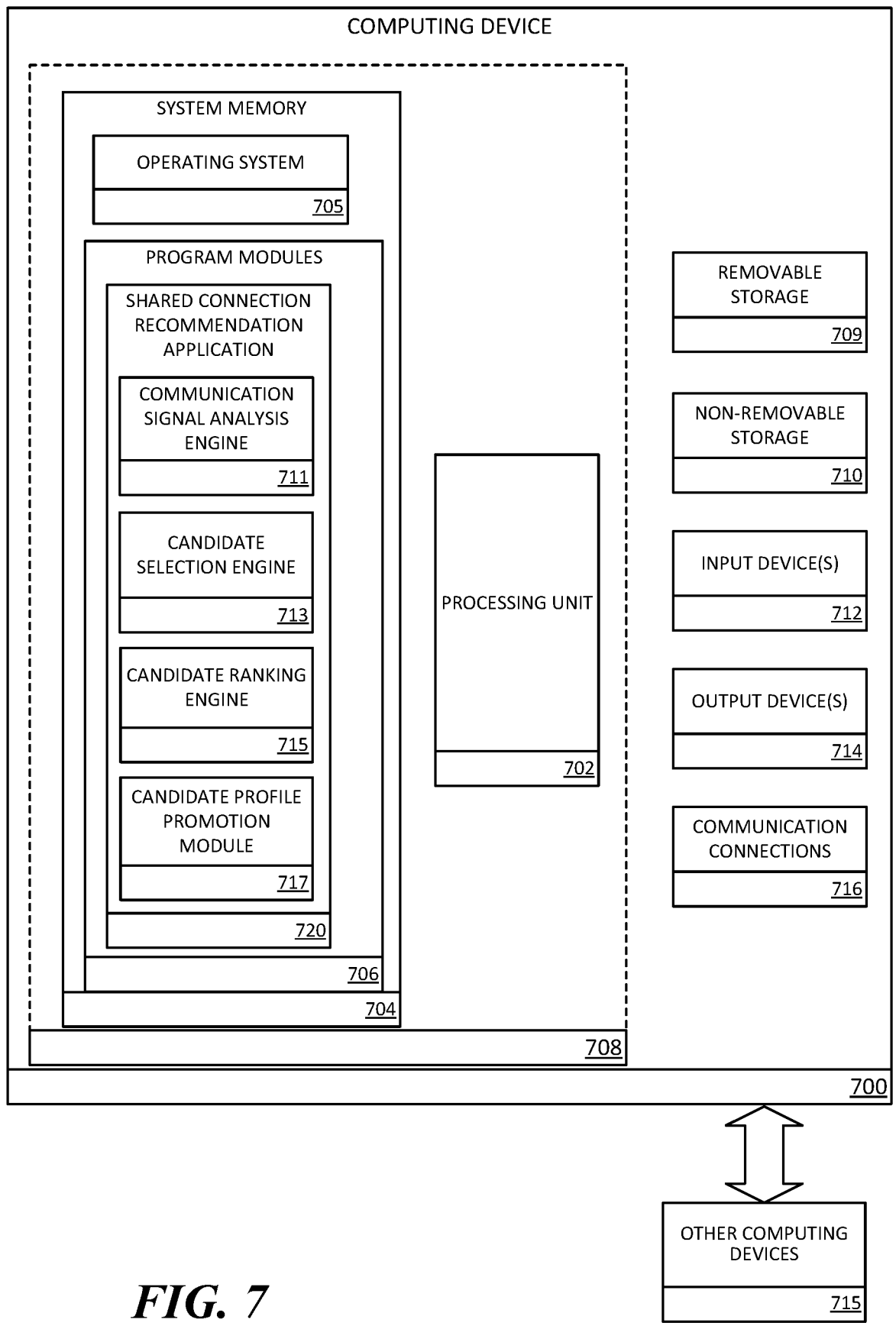
FIG. 7 is a block diagram illustrating example physical components of a computing device with which aspects of the disclosure may be practiced.

FIG. 7 is a block diagram illustrating physical components (e.g., hardware) of a computing device 700 with which aspects of the disclosure may be practiced. The computing device components described below may have computer executable instructions for recommending a shared connection. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories. The system memory 804 may include an operating system 705 suitable for running one or more shared connection recommendation programs. The operating system 705, for example, may be suitable for controlling the operation of the computing device 700. Furthermore, embodiments of the disclosure may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, a number of program modules and data files may be stored in the system memory 704. While executing on the processing unit 802, the program modules 706 (e.g., shared connection recommendation application 720) may perform processes including, but not limited to, the aspects, as described herein. According to examples, the communication signal analysis engine 711 may perform operations associated with determining which user application profiles received communication signals relate to, determining a weight of each received communication signal, and calculating communication values between application users based on the analyzed signals. The candidate selection engine 713 may perform operations associated with identifying a candidate set of shared application users for recommending. The candidate ranking engine 715 may perform operations associated with calculating an importance value for each application user in a candidate set of shared application users, determining the importance of each candidate relative to a viewer, determining the importance of each candidate relative to a viewee, and determining the importance of each candidate based on a combination of the candidates importance to the viewer and viewee. The candidate profile promotion module may perform operations associated with causing one or more top ranked candidate profiles to be promoted on a graphical user interface in association with an application user's profile or contact card.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 700 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 700 may also have one or more input device(s) 712 such as a keyboard, a mouse, a pen, a sound or voice input device, a touch or swipe input device, etc. The output device(s) 714 such as a display, speakers, a printer, etc. may also be included. The aforementioned devices are examples and others may be used. The computing device 700 may include one or more communication connections 716 allowing communications with other computing devices 750. Examples of suitable communication connections 716 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 704, the removable storage device 709, and the non-removable storage device 710 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 8:
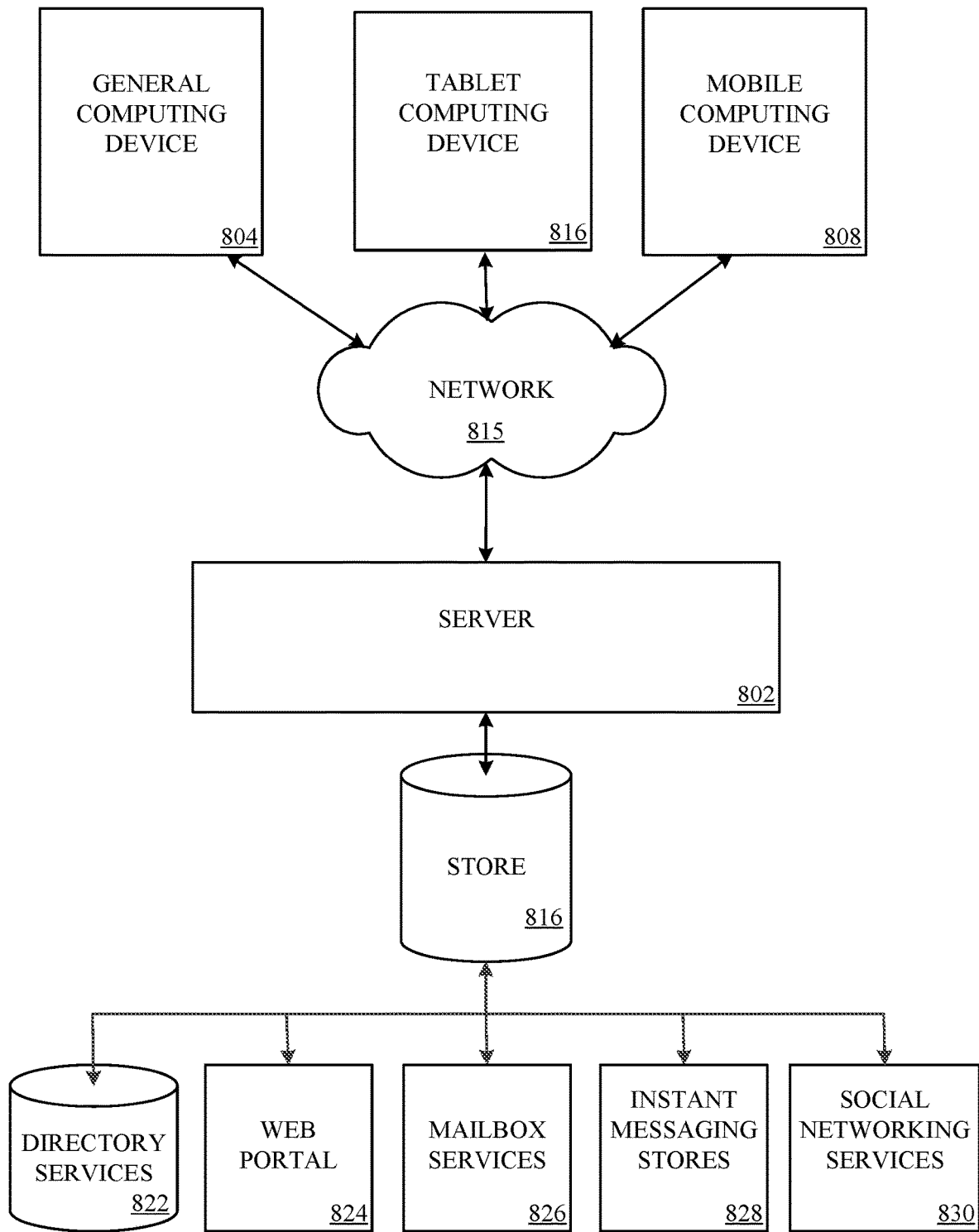
FIG. 8 is a simplified block diagram of a distributed computing system in which aspects of the present disclosure may be practiced.

FIG. 8 illustrates one aspect of the architecture of a system for processing data received at a computing system from a remote source, such as a personal/general computer 804, tablet computing device 806, or mobile computing device 808, as described above. Content displayed at server device 802 may be stored in different communication channels or other storage types. For example, various documents may be stored using a directory service 822, a web portal 824, a mailbox service 826, an instant messaging store 828, or a social networking site 830. The program modules 706 may be employed by a client that communicates with server device 802, and/or the program modules 706 may be employed by server device 802. The server device 802 may provide data to and from a client computing device such as a personal/general computer 804, a tablet computing device 806 and/or a mobile computing device 808 (e.g., a smart phone) through a network 815. By way of example, the computer system described above with respect to FIGS. 5-7 may be embodied in a personal/general computer 804, a tablet computing device 806 and/or a mobile computing device 808 (e.g., a smart phone). Any of these embodiments of the computing devices may obtain content from the store 816, in addition to receiving graphical data useable to be either pre-processed at a graphic-originating system, or post-processed at a receiving computing system.

Figure 9:
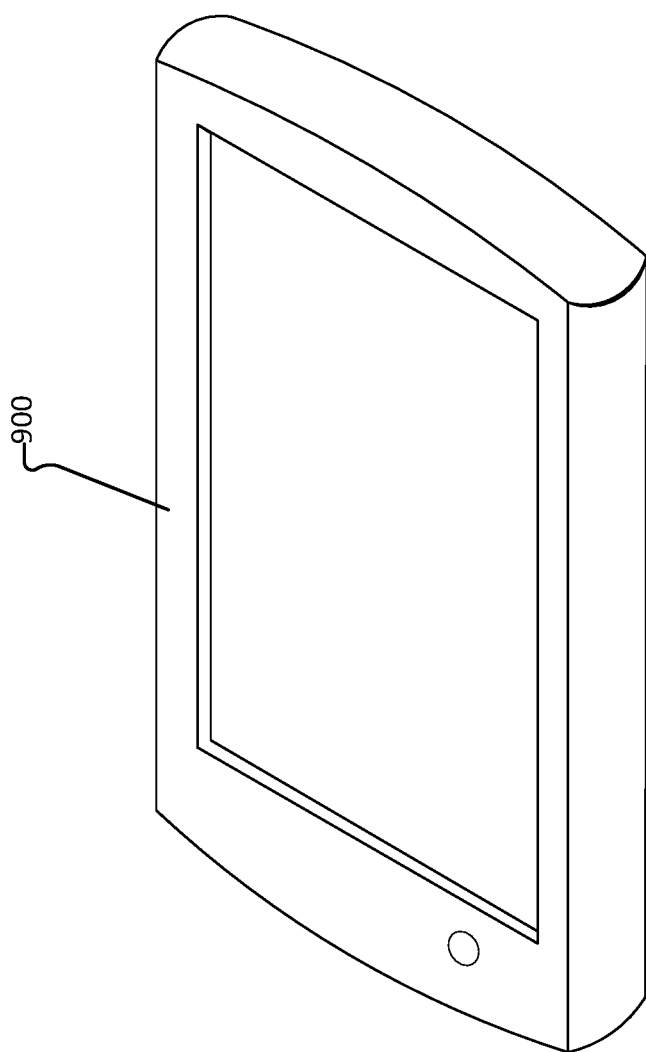
FIG. 9 illustrates a tablet computing device for executing one or more aspects of the present disclosure.

FIG. 9 illustrates an exemplary tablet computing device 900 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

As will be understood from the foregoing disclosure, one aspect of the technology relates to a method for recommending a shared connection, comprising: calculating a communication value associated with communications between a first user associated with a first profile of an application and a second user associated with a second profile of the application; determining whether the communication value is lower than a recommendation surfacing threshold value; identifying a candidate set of user profiles to recommend to the first user; ranking each of the candidate user profiles according to an importance value associated with each user of the candidate set of user profiles; and causing at least one of the candidate user profiles to be promoted based on the ranking. In some examples calculating the communication value comprises collecting a plurality of communication signals shared between the first user and the second user. In other examples the plurality of signals comprise at least one of: a number of shared emails, a number of shared calendar application appointment entries, a number of shared voice calls, a number of shared video calls, and a number of shared application messages, a number of shared message conversations. In another example each of the plurality of signals has a different weight assigned to it as applied in calculating the communication value. In yet other examples identifying a candidate set of user profiles to recommend to the first user further comprises determining a plurality of users that collaborate with the first user and the second user, and wherein each of the plurality of users has a profile associated with the application. In still other examples, identifying the candidate set of user profiles to recommend to the first user comprises: calculating a first candidate communication value associated with communications between the first user and each of the plurality of users, wherein calculating the first candidate communication value comprises collecting a plurality of communication signals shared between the first user and each of the plurality of users; calculating a second candidate communication value associated with communications between the second user and each of the plurality of users, wherein calculating the second candidate communication value comprises collecting a plurality of communication signals shared between the second user and each of the plurality of users; and identifying the candidate set of user profiles from the plurality of users that meet a minimum first candidate communication value and a minimum second candidate communication value. In additional examples, each of the users included in the candidate set of user profiles meet a minimum candidate communication value with the first user, and a minimum candidate communication value with the second user. In some examples the importance value associated with each user of the candidate set of user profiles is a metric determined from the calculated first candidate communication value, and the calculated second candidate communication value. In other examples causing at least one of the candidate profiles to be promoted based on the ranking comprises: adjusting the display of a highest ranked candidate profile on a user interface displaying the second profile. In additional examples adjusting the display of a highest ranked candidate profile further comprises increasing the prominence of the highest ranked candidate profile on the user interface displaying the second profile. In another example increasing the prominence of the highest ranked candidate profile further comprises causing the highest ranked candidate profile to be displayed at the top of a set of user application profiles displayed on the user interface displaying the second profile. According to some examples the set of user application profiles comprise users of the application that have electronically communicated with the second user. In another example the recommendation surfacing threshold value comprises a metric corresponding to a level of electronic communication that the first user and the second user have had amongst themselves, and wherein the at least one candidate user profiles are not caused to be promoted if the communication value is determined to be higher than the recommendation surfacing threshold value; and the at least one candidate user profiles are caused to be promoted if the communication value is determined to be lower than the recommendation surfacing threshold value.

In another aspect, the technology relates to a system for recommending a shared connection, the system comprising: a memory for storing executable program code; and a processor, functionally coupled to the memory, the processor being responsive to computer-executable instructions contained in the program code and operative to: calculate a communication value associated with communications between a first user associated with a first profile of an application and a second user associated with a second profile of the application; determine whether the communication value is lower than a recommendation surfacing threshold value; identify a candidate set of user profiles to recommend to the first user; rank each of the candidate user profiles according to an importance value associated with each of the candidate set of user profiles; and cause at least one of the candidate user profiles to be promoted based on the ranking. In some examples identifying the candidate set of profiles to recommend to the first user, the processor is further responsive to the computer-executable instructions and operative to: determine a plurality of users that collaborate with the first user and the second user, wherein each of the plurality of users has a profile associated with the application. In other examples identifying the candidate set of profiles to recommend to the first user, the processor is further responsive to the computer-executable instructions and operative to: calculate a first candidate communication value associated with communications between the first user and each of the plurality of users, wherein calculating the first candidate communication value comprises collecting a plurality of communication signals shared between the first user and each of the plurality of users; calculate a second candidate communication value associated with communications between the second user and each of the plurality of users, wherein calculating the second candidate communication value comprises collecting a plurality of communication signals shared between the second user and each of the plurality of users; and identify the candidate set of user profiles from the plurality of users that meet a minimum first candidate communication value and a minimum second candidate communication value. In additional examples the importance value associated with each user of the candidate set of user profiles is a metric determined from the calculated first candidate communication value, and the calculated second candidate communication value.

In another aspect, the technology relates to a computer-readable storage device comprising executable instructions, that when executed by a processor, assist with recommending a shared connection, the computer-readable storage device including instructions executable by the processor for: calculating a communication value associated with communications between a first user associated with a first profile of an application and a second user associated with a second profile of the application; determining whether the communication value is lower than a recommendation surfacing threshold value; identifying a candidate set of user profiles to recommend to the first user; ranking each of the candidate user profiles according to at least one of: a communication value calculated between each of a plurality of users associated with each of the candid set of user profiles and the first user, and a communication value calculated between each of the plurality of users associated with each of the candidate set of user profiles and the second user; and causing at least one of the candidate user profiles to be promoted based on the ranking. In additional examples identifying a candidate set of user profiles to recommend to the first user further comprises determining a plurality of users that collaborate with the first user and the second user, and wherein each of the plurality of users has a profile associated with the application. In another example each of the users included in the candidate set of user profiles meet a minimum candidate communication value for the first user, and a minimum candidate communication value with the second user.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this application that do not depart from the broader scope of the claimed disclosure.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A system comprising:
a processor; and
memory storing instructions that when executed by the processor case the system to perform a set of operations comprising:
calculating a first communication value associated with communications between a first user and a second user;
determining that the first communication value is lower than a recommendation surfacing threshold value;
based on the first communication value being lower than the recommendation surfacing threshold value, identifying a candidate set of user profiles to display to the first user, wherein the candidate set of user profiles includes a third user's profile and a fourth user's profile; and
displaying the candidate set of user profiles based on at least:
a second communication value associated with communications between the first user and the third user; and
a third communication value associated with communications between the first user and the fourth user.

2. The system of claim 1, wherein displaying the candidate set of user profiles is further based on a fourth communication value associated with communications between the second user and the third user.

3. The system of claim 1, wherein displaying the candidate set of user profiles is further based on a fifth communication value associated with communications between the second user and the fourth user.

4. The system of claim 1, wherein the candidate set of user profiles are displayed concurrently with a display of a user profile of the second user.

5. The system of claim 1, wherein the first communication value is based on communications between the first user and the second user in a first application and a second application.

6. The system of claim 1, wherein the first communication value is based on at least one email between the first user and the second user.

7. The system of claim 6, wherein the first communication value is based on at least one of a length of the email, a content of the email, a number of other users that the email has listed in a "to" field, or a number of other users that the email has listed in a "cc" field.

8. A computer-implemented method comprising:
calculating a first communication value associated with communications between a first user and a second user;
determining that the first communication value is lower than a recommendation surfacing threshold value;
based on the first communication value being lower than the recommendation surfacing threshold value, identifying a candidate set of user profiles to display to the first user, wherein the candidate set of user profiles includes a third user's profile and a fourth user's profile; and
displaying the candidate set of user profiles based on at least:
a second communication value associated with communications between the first user and the third user; and
a third communication value associated with communications between the first user and the fourth user.

9. The computer-implemented method of claim 8, wherein displaying the candidate set of user profiles is further based on a fourth communication value associated with communications between the second user and the third user.

10. The computer-implemented method of claim 8, wherein displaying the candidate set of user profiles is further based on a fifth communication value associated with communications between the second user and the fourth user.

11. The computer-implemented method of claim 8, wherein the candidate set of user profiles are displayed concurrently with a display of a user profile of the second user.

12. The computer-implemented method of claim 8, wherein the candidate set of user profiles are displayed concurrently with a display of a user profile of the second user.

13. The computer-implemented method of claim 8, wherein the first communication value is based on communications between the first user and the second user in a first application and a second application.

14. The computer-implemented method of claim 8, wherein the first communication value is based on at least one calendar invite between the first user and the second user.

15. The computer-implemented method of claim 14, wherein the first communication value is based on at least one of a length of a calendar appointment associated with the calendar invite, a content of the calendar invite, or a number of other users included on the calendar invite.

16. A computer-implemented method comprising:
  calculating a first communication value associated with communications in a first application between a first user and a second user;
  calculating a second communication value associated with communications in a second application between a first user and a second user;
  based on the first communication value and the second communication value, identifying a candidate set of user profiles to display to the first user; and
  displaying the candidate set of user profiles based on additional communication values between the users of the user profiles in the candidate set and at least one of the first user or the second user.

17. The computer-implemented method of claim 16, wherein the first application is one of an email application, a calendar application, a voice call application, a video call application, or a text communication application.

18. The computer-implemented method of claim 17, wherein the second application is different from the first application, and the second application is one of an email application, a calendar application, a voice call application, a video call application, or a text communication application.

19. The computer-implemented method of claim 16, wherein the additional communication values are based on communications between the first user and the users of the user profiles in the candidate set via at least one of an email application, a calendar application, a voice call application, a video call application, or a text communication application.

20. The computer-implemented method of claim 16, wherein the candidate set of user profiles are displayed concurrently with a user profile of the second user.

* * * * *